US012529319B2

United States Patent
Capetillo et al.

(10) Patent No.: US 12,529,319 B2
(45) Date of Patent: Jan. 20, 2026

(54) HIGH PRESSURE TURBINE BLADE DOUBLE SCARF CUT

(71) Applicant: RTX Corporation, Farmington, CT (US)

(72) Inventors: Alfonso Capetillo, Hamilton, OH (US); William Reinhardt, Jr., Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/582,919

(22) Filed: Feb. 21, 2024

(65) Prior Publication Data
US 2025/0264024 A1 Aug. 21, 2025

(51) Int. Cl.
*F01D 5/14* (2006.01)
*F01D 5/30* (2006.01)

(52) U.S. Cl.
CPC .......... *F01D 5/147* (2013.01); *F01D 5/3007* (2013.01); *F05D 2240/80* (2013.01)

(58) Field of Classification Search
CPC .......... F01D 5/147; F01D 5/30; F01D 5/3007; F01D 5/3015
See application file for complete search history.

(56) References Cited

U.S. PATENT DOCUMENTS

| 2,807,436 | A | 9/1957 | Hockert |
| 5,567,116 | A | 10/1996 | Bourcier |
| 5,836,744 | A | 11/1998 | Zipps et al. |
| 6,846,159 | B2 * | 1/2005 | Zabawa ................ F01D 5/3015 416/223 R |
| 9,810,077 | B2 * | 11/2017 | Murdock .............. F01D 5/3007 |
| 2003/0194321 | A1 * | 10/2003 | Barnette ............... F01D 5/3092 416/248 |
| 2013/0209253 | A1 | 8/2013 | Zemitis et al. |
| 2016/0032739 | A1 | 2/2016 | Sekihara et al. |
| 2025/0264024 | A1 * | 8/2025 | Capetillo ................ F01D 5/147 |

FOREIGN PATENT DOCUMENTS

| DE | 19705323 A1 * | 8/1998 | .......... F01D 5/3007 |
| WO | 2022258911 A1 | 12/2022 | |

OTHER PUBLICATIONS

AI/Human-assisted translation of DE 19705323 A1 (Aug. 27, 1998) (Year: 1998).*
Extended European Search Report dated Mar. 31, 2025, for corresponding European Patent Application No. 25158944.6, 14 pgs.

* cited by examiner

*Primary Examiner* — Christopher R Legendre
(74) *Attorney, Agent, or Firm* — Kinney & Lange, P.A.

(57) ABSTRACT

A turbine blade includes a root section extending from a bottom side of a platform. The root section includes a first end and a second end aft of the first end. A first plurality of serrations is formed on a pressure side of the root section. A second plurality of serrations is formed on a suction side of the root section. Each serration of the second plurality of serrations extends on the suction side from the first end to the second end of the root section. A first scarf cut is formed on each serration of the second plurality of serrations such that each serration of the second plurality of serrations is tapered at the first end of the root section.

18 Claims, 7 Drawing Sheets

HIGH PRESSURE TURBINE BLADE DOUBLE SCARF CUT

BACKGROUND

The present disclosure relates to gas turbine engines, and in particular, to turbine rotor blades.

A gas turbine engine typically includes a fan section, a compressor section, a combustor section and a turbine section. Air entering the compressor section is compressed and delivered into the combustion section where it is mixed with fuel and ignited to generate a hot and high-speed exhaust gas flow. The high-speed exhaust gas flow expands through the turbine section to drive the compressor and the fan section.

The turbine section includes turbine vanes to guide and direct the high-speed exhaust gas flow across turbine rotor blades in the turbine section. As the high-speed exhaust gas flow across the turbine rotor blades, the high-speed exhaust gas flow rotates the rotor blades to power the compressor section and/or the fan section. The turbine rotor blades are generally attached to a disk. The disk includes attachment grooves that each include a fir-tree pattern that is shaped to receive a fir-tree shaped attachment root of a turbine rotor blade. During operation of the turbine section, stress can build up between the attachment roots of the turbine rotor blades and the attachment grooves of the disk, causing wear on the disk and reducing the operation life of the disk.

SUMMARY

In one example, a turbine blade includes a platform with a top side and a bottom side opposite the top side. An airfoil section extends from the top side of the platform to a tip of the turbine blade. A root section is connected to a bottom side of the platform and includes an attachment body extending from a forward end to an aft end. A first plurality of serrations is formed on a pressure side of the attachment body. Each serration of the first plurality of serrations extends straight on the pressure side of the attachment body from the aft end toward the forward end of the attachment body. A second plurality of serrations is formed on a suction side of the attachment body. Each serration of the second plurality of serrations extends straight in a first direction on the suction side from the aft end toward the forward end of the attachment body. The first plurality of serrations and the second plurality of serrations form a fir-tree shaped profile of the attachment body. An angled surface is formed on the suction side of the attachment body adjacent to the forward end. The angled surface extends along each serration of the second plurality of serrations and is angled toward the pressure side relative to the first direction as the angled surface extends toward the forward end.

In another example, a turbine blade includes a platform with a top side and a bottom side opposite the top side. An airfoil section extends from the top side of the platform to a tip of the turbine blade. A root section extends from the bottom side of the platform. The root section includes a first end and a second end aft of the first end relative to a flow direction of the turbine blade. A first plurality of serrations is formed on a pressure side of the root section. Each serration of the first plurality of serrations extends on the pressure side of the root section from the first end to the second end of the root section. A second plurality of serrations is formed on a suction side of the root section. Each serration of the second plurality of serrations extends on the suction side from the first end to the second end of the root section. The first plurality of serrations and the second plurality of serrations form a fir-tree shaped profile of the root section. A first scarf cut is formed on the suction side of the root section and extends aft from the first end toward the second end of the root section. The first scarf cut is formed on each serration of the second plurality of serrations such that each serration of the second plurality of serrations is tapered at the first end of the root section.

In yet another example, a turbine blade includes a platform comprising a top side and a bottom side opposite the top side. An airfoil section extends from the top side of the platform to a tip of the turbine blade. A root section is connected to a bottom side of the platform. The root section includes an attachment body extending from a forward end to an aft end. A first plurality of serrations is formed on a pressure side of the attachment body. Each serration of the first plurality of serrations extends on the pressure side of the attachment body from the forward end to the aft end of the attachment body. A second plurality of serrations is formed on a suction side of the attachment body. Each serration of the second plurality of serrations extends on the suction side from the forward end to the aft end of the attachment body. The first plurality of serrations and the second plurality of serrations form a fir-tree shaped profile of the attachment body. Each serration of the second plurality of serrations is tapered at the forward end.

Figure 1:
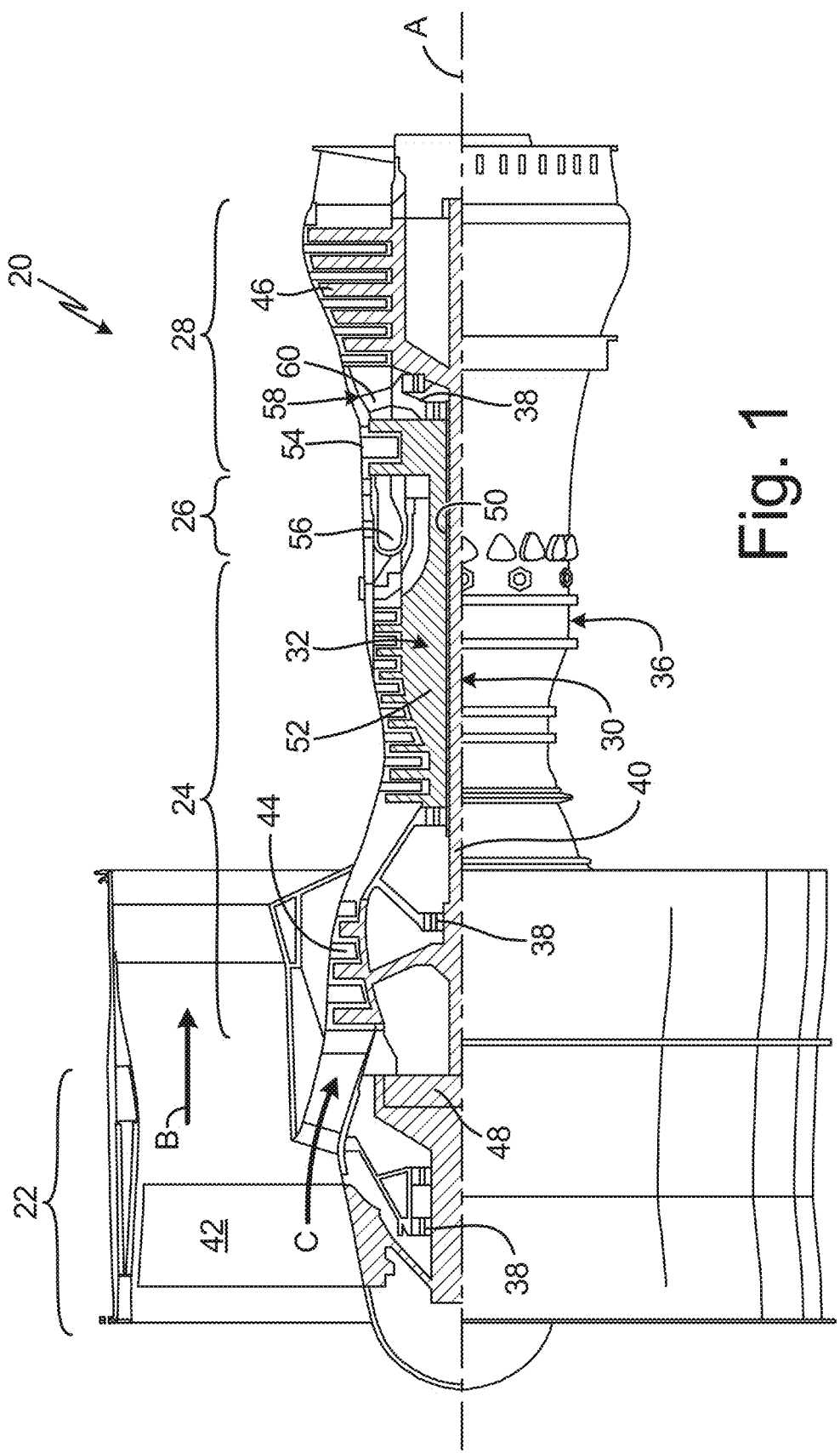
FIG. 1 is a partial cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

This disclosure relates to a turbine blade with a scarf cut formed on a suction side of the root section of the turbine blade adjacent to a forward end of the root section. The root section includes a fir-tree shape profile with a first plurality of serrations on a pressure side of the root section and a second plurality of serrations on the suction side of the root section. The scarf cut creates an angled surface on each serration of the second plurality of serrations that extends aftward on the suction side from the forward end of the root section. The root section of the turbine blade is installed into the attachment grooves of a rotor disk of a gas turbine engine. The scarf cuts on the blade reduce and distribute the contact pressure concentration on the disk that is imparted from the blade at the forward end of the disk attachment, which increases the operational life of the rotor disk. The turbine blade with the scarf cut on the suction side of the root section is discussed below with reference to the figures.

FIG. 1 is a cross-sectional view that schematically illustrates example gas turbine engine 20 that includes fan section 22, compressor section 24, combustor section 26 and turbine section 28. Fan section 22 drives air along bypass flowpath B while compressor section 24 draws air in along core flowpath C where air is compressed and communicated to combustor section 26. In combustor section 26, air is mixed with fuel and ignited to generate a high-pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section.

The example gas turbine engine 20 generally includes low speed spool 30 and high speed spool 32 mounted for rotation about center axis A of gas turbine engine 20 relative to engine static structure 36 via several bearing systems 38. It should be understood that various bearing systems 38 at various locations may alternatively or additionally be provided.

Low speed spool 30 generally includes inner shaft 40 that connects fan 42 and low-pressure (or first) compressor section 44 to low-pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high-pressure (or second) compressor section 52 and high-pressure (or second) turbine section 54. Inner shaft 40 and outer shaft 50 are concentric and rotate via bearing systems 38 about center axis A.

Combustor 56 is arranged between high-pressure compressor 52 and high-pressure turbine section 54. In one example, high-pressure turbine section 54 includes at least two stages to provide double stage high-pressure turbine section 54. In another example, high-pressure turbine section 54 includes only a single stage. As used herein, a "high-pressure" compressor or turbine experiences a higher pressure than a corresponding "low-pressure" compressor or turbine. The example low-pressure turbine section 46 has a pressure ratio that is greater than about 5. The pressure ratio of the example low-pressure turbine section 46 is measured prior to an inlet of low-pressure turbine section 46 as related to the pressure measured at the outlet of low-pressure turbine section 46 prior to an exhaust nozzle.

Mid-turbine frame 58 of engine static structure 36 can be arranged generally between high-pressure turbine section 54 and low-pressure turbine section 46. Mid-turbine frame 58 further supports bearing systems 38 in turbine section 28 as well as setting airflow entering the low-pressure turbine section 46. Mid-turbine frame 58 includes vanes 60, which are in the core flowpath and function as inlet guide vanes for low-pressure turbine section 46.

The gas flow in core flowpath C is compressed first by low-pressure compressor 44 and then by high-pressure compressor 52. The gas flow in core flowpath C is then mixed with fuel and ignited in combustor 56 to produce high speed exhaust gases that are then expanded through high-pressure turbine section 54 and low-pressure turbine section 46. As discussed below with reference to FIG. 2, high-pressure turbine section 54 and low-pressure turbine section 46 include turbine vanes to guide the gas flow through high-pressure turbine section 54 and low-pressure turbine section 46 and include turbine blades that are worked and rotated by the gas flow.

Figure 2:
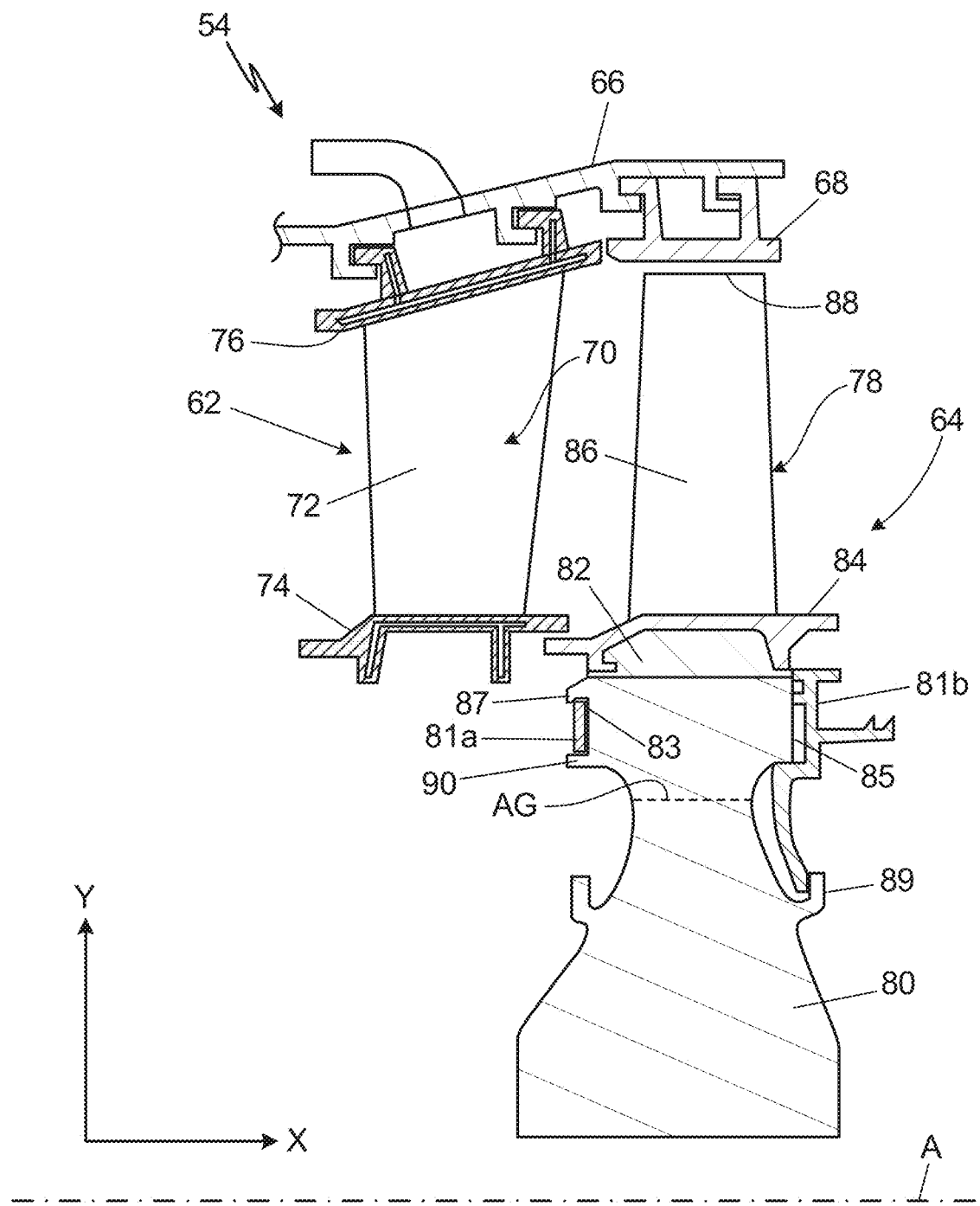
FIG. 2 is a cross-sectional view of a turbine section of the gas turbine engine of FIG. 1.

FIG. 2 is a cross-sectional view of high-pressure turbine section 54 of gas turbine engine 20 of FIG. 1. As shown in FIG. 2, high-pressure turbine section 54 includes vane stage 62, rotor stage 64, case 66, and blade outer air seal (BOAS) 68. Vane stage 62 includes vanes 70, with each of vanes 70 including airfoil section 72 extending between inner platform 74 and outer platform 76 to define a portion of core flowpath C. Rotor stage 64 includes turbine blades 78 connected to rotor disk 80. Rotor stage 64 can also include forward retaining plate 81a and aft retaining plate 81b. Each of turbine blades 78 includes root section 82, platform 84, airfoil section 86, and tip 88. Rotor disk 80 includes forward side 83, aft side 85, forward retaining hook 87, aft retaining hook 89, seat 90, and a plurality of attachment grooves AG (shown in phantom). An axial direction X and a radial direction Y are shown in FIG. 2. The axial direction X is parallel to center axis A and the radial direction Y extends radially outward from the axial direction X.

In the example of FIG. 2, vane stage 62 is axially forward and upstream from rotor stage 64 and guides and conditions the gas flow in core flowpath C before the gas flow reaches rotor stage 64. The plurality of attachment grooves AG are formed in rotor disk 80 such that the plurality of attachment grooves AG are circumferentially space apart from each about center axis A. Each turbine blade 78 is connected to rotor disk 80 by mating root section 82 with one of attachment grooves AG such that turbine blades 78 are circumferentially arrayed about rotor disk 80 and center axis A. Forward retaining hook 87 is formed on forward side 83 of rotor disk 80, and aft retaining hook 89 is formed on aft side 85 of rotor disk 80. The forward retaining plate 81a can be mounted into forward retaining hook 87 and seat 90. Aft retaining plate 81b can be mounted into aft retaining hook 89. Together, forward retaining plate 81a and aft retaining plate 81b axially lock each turbine blade 78 into one of attachment grooves AG formed in rotor disk 80. Platform 84 for each turbine blade 78 is connected to root section 82 and forms a radially inner flowpath surface for core flowpath C across rotor stage 64. Airfoil section 86 on each turbine blade 78 extends radially outward from platform 84 to tip 88. BOAS 68 is spaced radially outward from tip 88 of each turbine blade 78 and extends circumferentially about rotor stage 64 and center axis A. BOAS 68 forms a radially outer flowpath surface for core flowpath C across rotor stage 64. Case 66 is a stationary structure that extends circumferentially around vane stage 62 and rotor stage 64 and supports vane stage 62 and BOAS 68. While high-pressure turbine section 54 is shown in FIG. 2 has having a single vane stage 62 and a single rotor stage 64, high-pressure turbine section 54 can have multiple rotor stages 64 and multiple vane stages 62. Low-pressure turbine section 46 can also include multiple rotor stages 64 and multiple vane stages 62.

Figure 3:
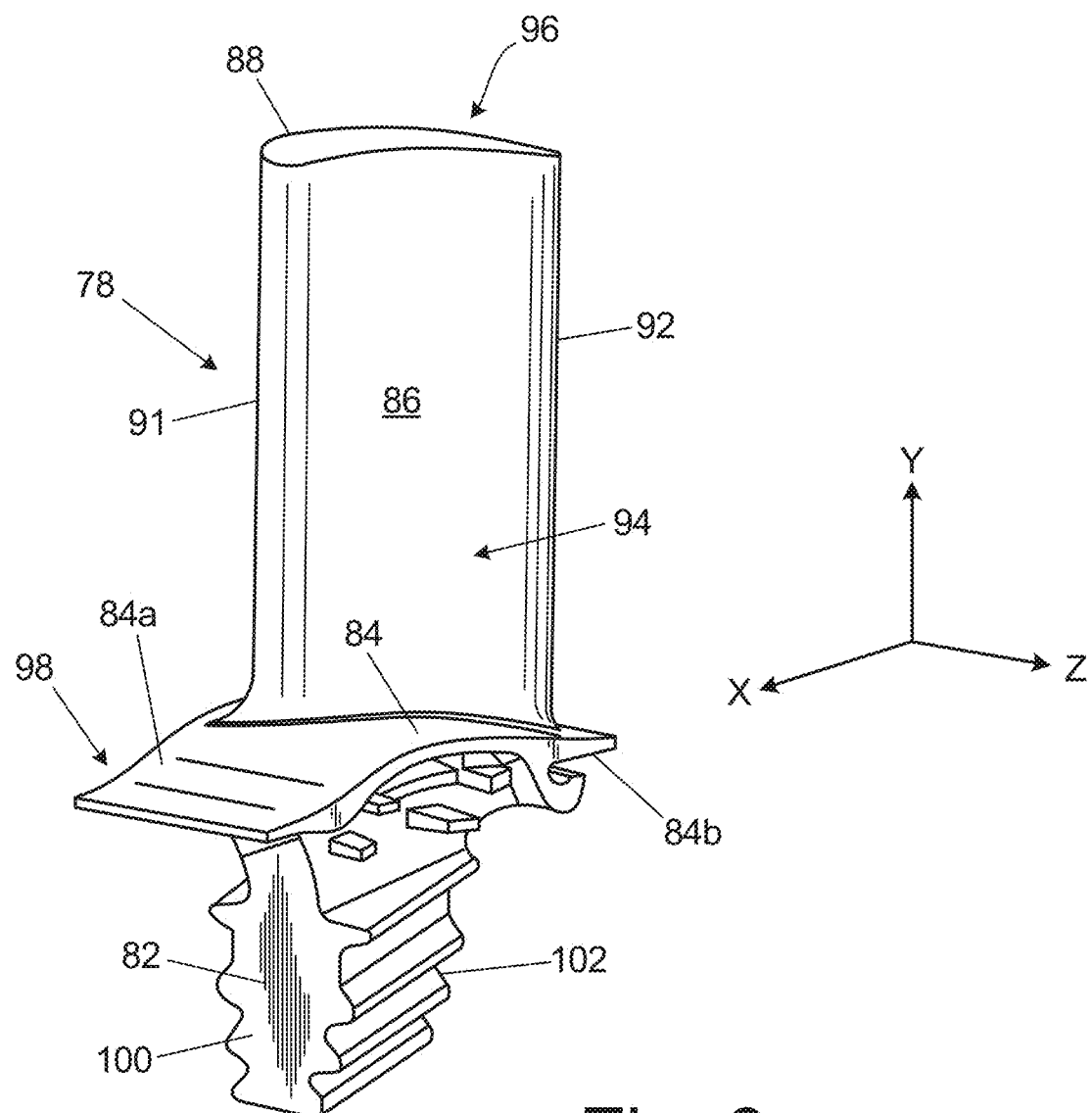
FIG. 3 is a perspective view of a turbine blade from the turbine section of FIG. 2.

FIG. 3 is a perspective view of turbine blade 78 from rotor stage 64 of FIG. 2. As previously noted above with reference to FIG. 2, turbine blade 78 includes root section 82, platform 84, airfoil section 86, and tip 88. Airfoil section 86 of turbine blade 78 includes leading edge 91, trailing edge 92, pressure surface 94, and suction surface 96. Root section 82 and/or platform 84 form base 98 of turbine blade 78. Root section includes forward end 100 and aft end 102.

Top side 84a of platform 84 forms an inner endwall flow surface of turbine blade 78. Bottom side 84b is opposite top side 84a in the radial direction Y and is outside of core flowpath C. Root section 82 is connected to bottom side 84b and extends downward from bottom side 84b of platform 84. Root section 82 extends aftward from forward end 100 to aft end 102. As shown in FIG. 3, root section 82 can be a fir-tree shaped root for connecting turbine blade 78 to rotor disk 80. Root section 82 and/or platform 84 can form base 98 of turbine blade 78.

Tip 88 of turbine blade 78 is radially outward from base 98 in the radial direction Y. Airfoil section 86 extends from top side 84a of platform 84 to tip 88 of turbine blade 78. Leading edge 91 extends radially outward from top side 84a of platform 84 in the radial direction Y to tip 88. Trailing edge 92 also extends radially outward from top side 84a of platform 84 to tip 88 and is aft of leading edge 91 in the axial direction X.

Pressure side 94 is a generally concave surface of airfoil section 86 that extends from leading edge 91 to trailing edge 92 and also extends from top side 84a of platform 84 to tip 88. Suction side 96 is a generally convex surface of airfoil section 86 that extends from leading edge 91 to the trailing edge 92 and extends from top side 84a of platform 84 to tip 88. Suction side 96 is opposite pressure side 94 in a circumferential direction Z, the circumferential direction Z generally being a direction of rotation of turbine blade 78 about center axis A of gas turbine engine 20 of FIG. 1.

Figure 4:
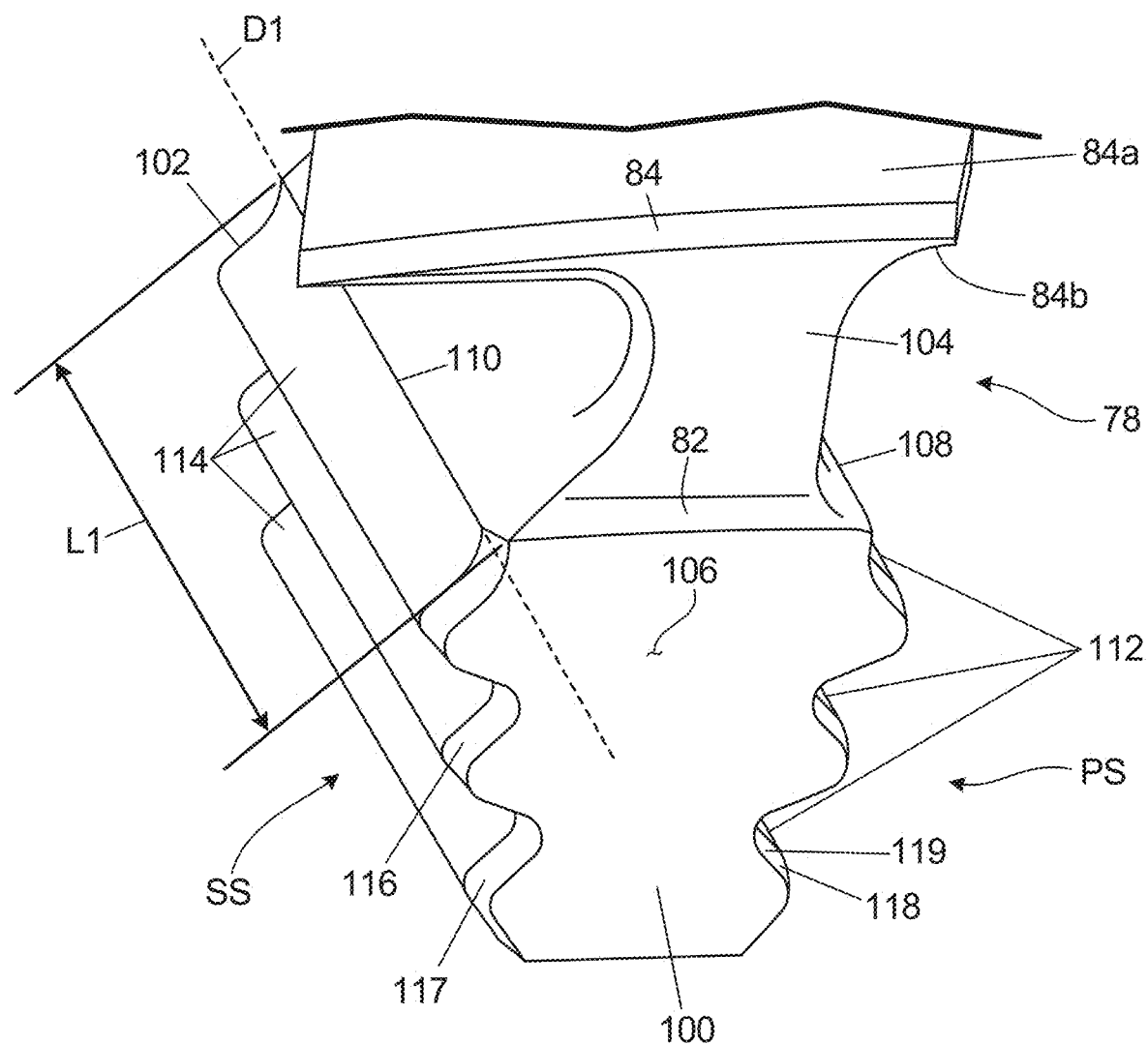
FIG. 4 is a perspective view of a root section of the turbine blade from FIG. 3.
Figure 5:
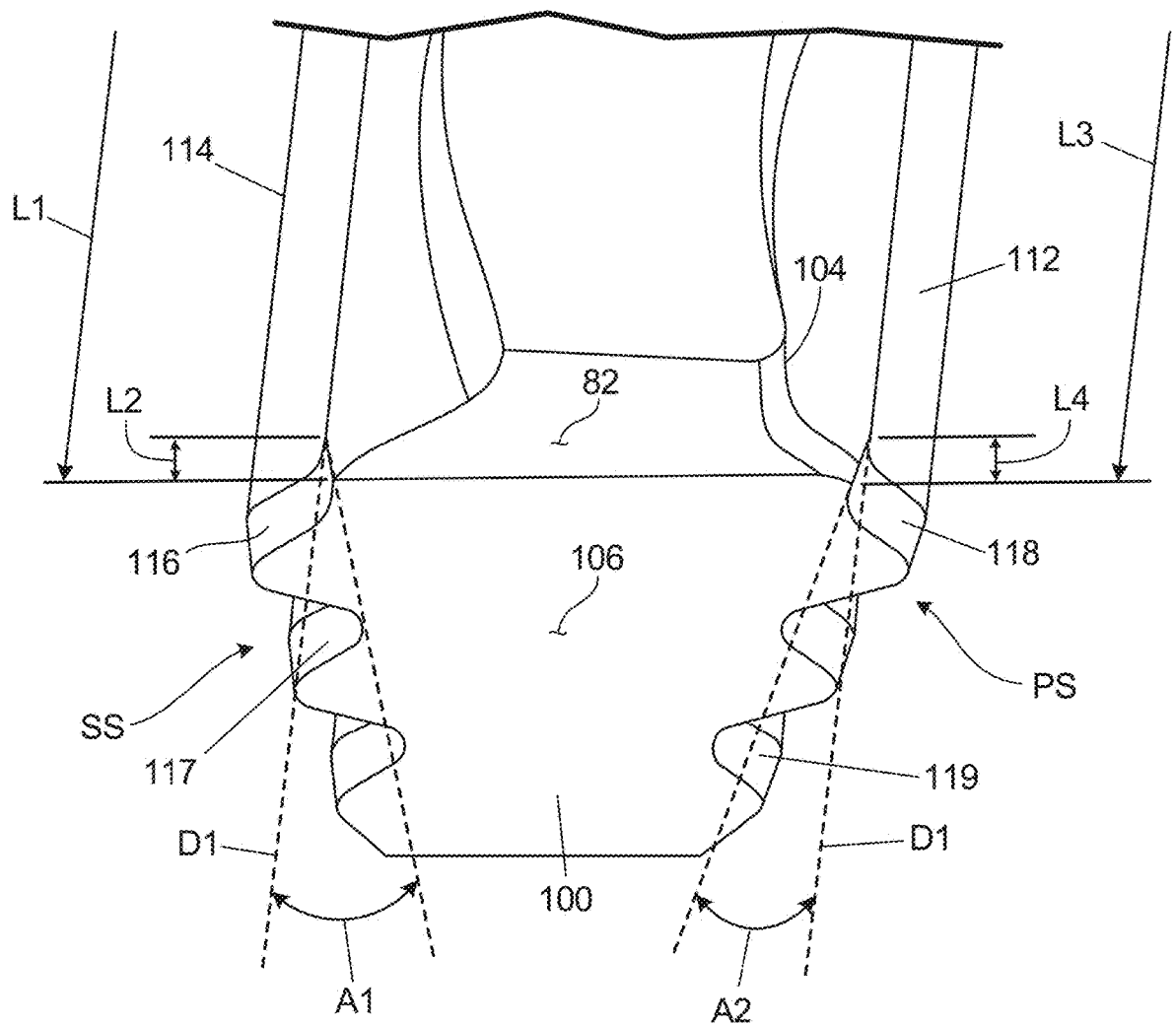
FIG. 5 is another perspective view of the root section of the turbine blade from FIG. 4 with a platform and blade removed.
Figure 6:
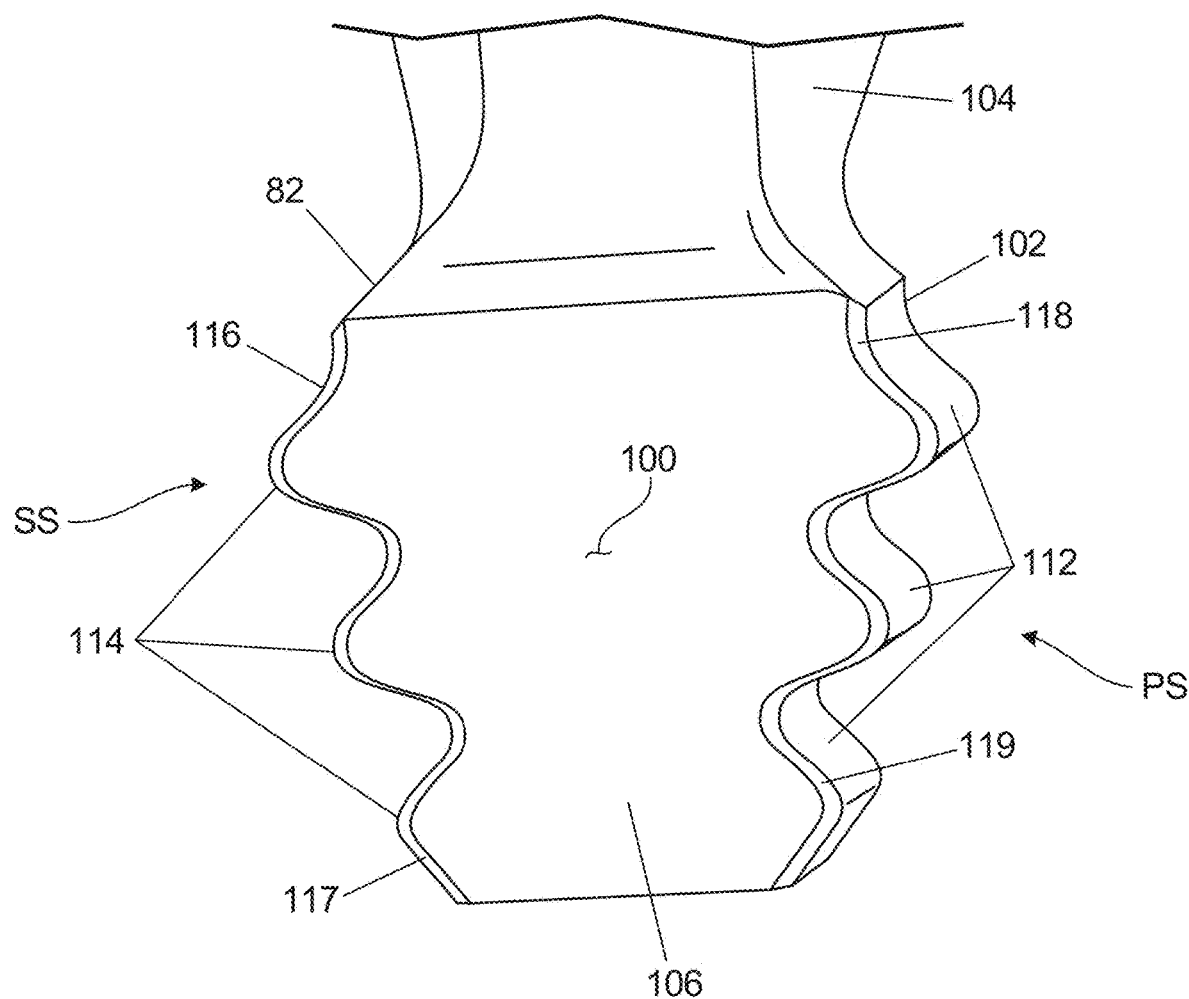
FIG. 6 is a front elevation view of the root section of the turbine blade from FIG. 4.

FIGS. 4-6 will be discussed concurrently. FIG. 4 is a perspective view of root section 82 of turbine blade 78. FIG. 5 is another perspective view of root section 82 of turbine blade 78 with platform 84 removed for better viewing of root section 82. FIG. 6 is a front elevation view of root section 82 of turbine blade 78 that allows a better view of pressure side PS compared to FIGS. 4 and 5. As shown in FIGS. 4-6, root section 82 further includes neck 104 and attachment body 106. Attachment body 106 includes pressure side PS, suction side SS, first edge 108, second edge 110, a first plurality of serrations 112, a second plurality of serrations 114, first scarf cut 116, first angled surface 117, second scarf cut 118, and second angled surface 119. As shown best in FIGS. 4 and 5, attachment body 106 also includes first length L1, second length L2, third length L3, and fourth length L4. First direction D1 is also shown in FIGS. 4-6. First direction D1 defines a dimension that is parallel to root section 82 as root section 82 extends from forward end 100 to aft end 102.

Attachment body 106 and neck 104 together form root section 82. Neck 104 connects attachment body 106 to platform 84. Attachment body 106 extends from forward end 100 to aft end 102 in first direction D1. Pressure side PS of attachment body 106 is on a same side of turbine blade 78 as pressure surface 94. Suction side SS of attachment body 106 is on a same side of turbine blade 78 as suction surface 96. First edge 108 forms a top edge of attachment body 106 on pressure side PS. Second edge 110 forms a top edge of attachment body 106 on suction side SS. In the example of FIGS. 4-6, first edge 108 and second edge 110 can both extend parallel to first direction D1 from aft end 102 toward forward end 100.

The first plurality of serrations 112 is formed on pressure side PS of attachment body 106. Each serration 112 of the first plurality of serrations 112 forms a lobe that extends outward from pressure side PS in a direction or dimension that is transverse to the first direction D1. Each serration 112 of the first plurality of serrations 112 also extends from forward end 100 to aft end 102 of attachment body 106. Together, serrations 112 of the first plurality of serrations 112 form an undulating and wave-like pattern on pressure side PS of attachment body 106 that extends from first edge 108 to a bottom end of attachment body 106. In the example of FIGS. 4-6, each serration 112 of the first plurality of serrations 112 extends straight on pressure side PS of attachment body 106 from aft end 102 toward forward end 100.

The second plurality of serrations 114 is formed on suction side SS of attachment body 106. Each serration 114 of the second plurality of serrations 114 forms a lobe that extends outward from suction side SS in a direction or dimension that is transverse to the first direction D1. Each serration 114 of the second plurality of serrations 114 also extends from forward end 100 to aft end 102 of attachment body 106. Together, serrations 114 of the second plurality of serrations 114 form an undulating and wave-like pattern on suction side SS of attachment body 106 that extends from second edge 110 to the bottom end of attachment body 106. In the example of FIG. 4, each serration 114 of the second plurality of serrations 114 extends straight on suction side SS of attachment body 106 from aft end 102 toward forward end 100. The first plurality of serrations 112 and the second plurality of serrations 114 together form a fir-tree shaped profile of attachment body 106 when viewed from forward end 100 or aft end 102. Each of the attachment grooves AG of rotor disk 80 (shown in FIG. 2) can also include a fir-tree shaped profile that mates with the fir-tree shaped profile of attachment body 106 when turbine blade 78 is assembled onto rotor disk 80.

First scarf cut 116 is formed on suction side SS of attachment body 106 of root section 82 adjacent to forward end 100. First scarf cut 116 forms first angled surface 117 that extends aft from forward end 100 toward aft end 102. As shown in FIGS. 4-6, first scarf cut 116 and first angled surface 117 are formed on each serration 114 of the second plurality of serrations 114 such that each serration 114 of the second plurality of serrations 114 is tapered at forward end 100. First angled surface 117 of first scarf cut 116 is angled toward pressure side SS relative to the first direction D1 as first angled surface 117 extends toward forward end 100.

As shown best in FIGS. 4 and 5, each serration 114 of the second plurality of serrations 114 extends straight in the first direction D1 from aft end 102 to first scarf cut 116. Suction side SS of attachment body 106 and each serration 114 on suction side SS includes first length L1. First length L1 is the distance suction side SS and serrations 114 extend from forward end 100 to aft end 102 in the first direction D1. First angled surface 117 of first scarf cut 116 includes second length L2. Second length L2 is the distance that first angled surface 117 extends in the first direction D1 from forward end 100 toward aft end 102. A ratio (L2/L1) of second length L2 to first length L1 is at least 0.05 and no greater than 0.08.

In the example of FIGS. 4-6, first length L1 is 1.517 inches (3.853 cm), second length L2 is 0.1 inches (0.254 cm), and the ratio (L2/L1) of the second length L2 to the first length L1 is 0.065.

As shown in FIG. 5, first angled surface 117 of first scarf cut 116 is angled toward pressure side PS at a first angle A1. First angle A1 has a value of at least 6 degrees and no greater than 10 degrees relative to the first direction D1. In the example of FIGS. 4-6, first angled surface 117 is angled toward pressure side PS such that first angle A1 has a value of 8 degrees relative to the first direction D1.

Second scarf cut 118 is formed on pressure side PS of attachment body 106 of root section 82 adjacent to forward end 100. Second scarf cut 118 forms second angled surface 119 that extends aft from forward end 100 toward aft end 102. Second scarf cut 118 and second angled surface 119 are formed on each serration 112 of the first plurality of serrations 112 such that each serration 112 of the first plurality of serrations 112 is tapered at forward end 100. Second angled surface 119 of second scarf cut 118 is angled toward suction side SS relative to the first direction D1 as second angled surface 119 extends toward forward end 100.

Each serration 112 of the first plurality of serrations 112 extends straight in the first direction D1 from aft end 102 to second scarf cut 118. Pressure side PS of attachment body 106 and each serration 112 on pressure side PS includes third length L3. Third length L3 is the distance pressure side PS and serrations 112 extend from forward end 100 to aft end 102 in the first direction D1. In the example of FIGS. 4-6, the third length L3 can be equal in length in the first direction D1 to first length L1 of suction side SS. Second angled surface 119 of second scarf cut 118 includes fourth length L4. Fourth length L4 is the distance that second angled surface 119 extends in the first direction D1 from forward end 100 toward aft end 102. A ratio (L4/L3) of fourth length L4 to third length L3 is at least 0.05 and no greater than 0.08. In the example of FIGS. 4-6, third length L3 is 1.517 inches (3.853 cm), fourth length L4 is 0.1 inches (0.254 cm), and the ratio (L4/L3) of the fourth length L4 to the third length L3 is 0.065.

Second angled surface 119 of second scarf cut 118 is angled toward suction side SS at a second angle A2. Second angle A2 has a value of at least 8 degrees and no greater than 10 degrees relative to the first direction D1. In the example of FIGS. 4-6, second angled surface 119 is angled toward suction side SS such that second angle A2 has a value of 10 degrees relative to the first direction D1. As discussed below with reference to FIGS. 7A and 7B, the above-described first scarf cut 116 with first angled surface 117 and the above-described second scarf cut 118 with second angled surface 119 helps reduce stress concentrations between each turbine blade 78 and rotor disk 80, which increases operational life of rotor disk 80.

Figures 7A, 7B:
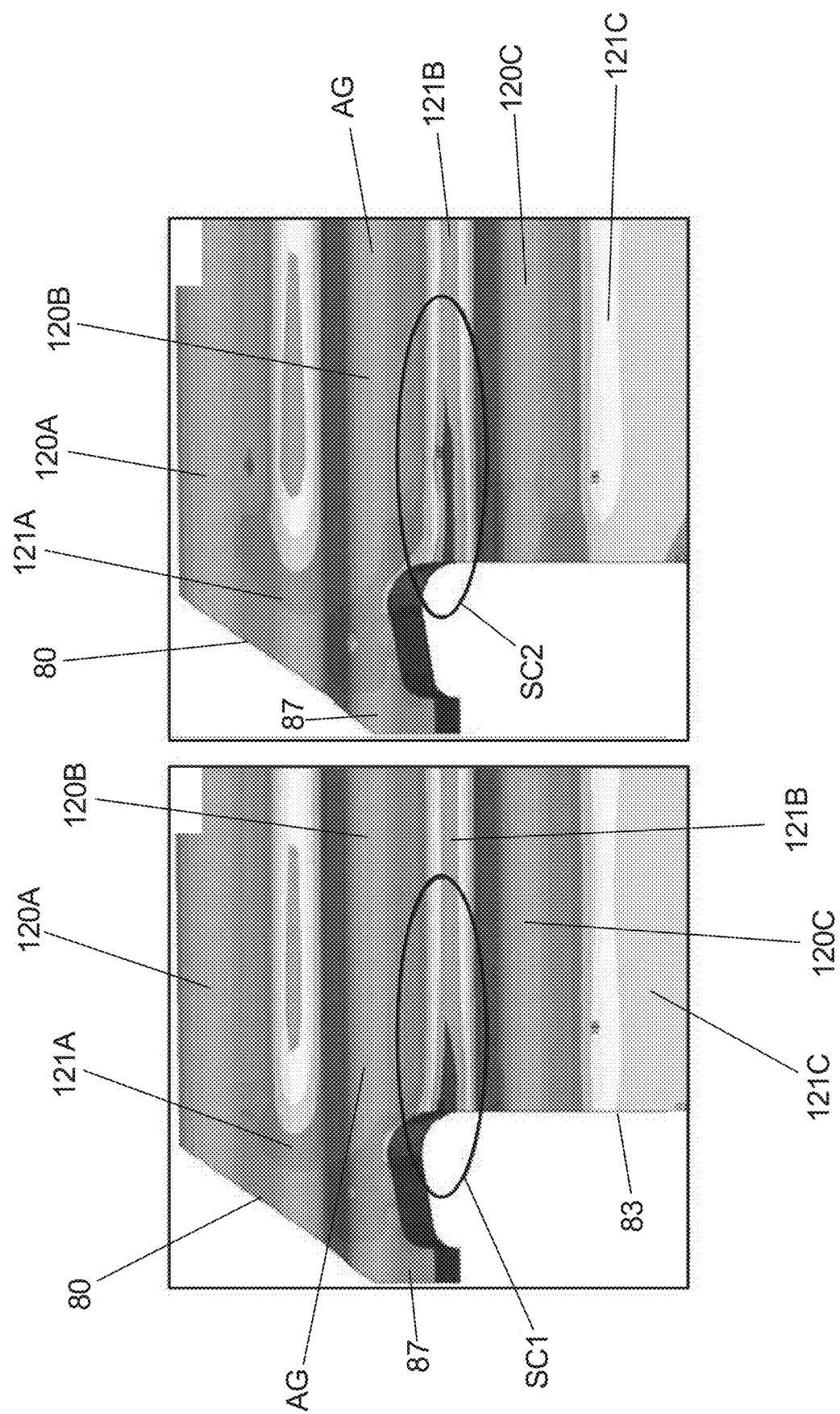
FIG. 7A is a stress diagram of an attachment groove of a rotor disk showing stress concentrations in the rotor disk caused by a root section of a traditional turbine blade.
FIG. 7B is a stress diagram of an attachment groove of a rotor disk showing stress concentrations in the rotor disk caused by the root section of the turbine blade of FIG. 6.

FIG. 7A is a stress diagram of one of attachment grooves AG of rotor disk 80 showing stress concentrations in rotor disk 80 caused by a root section of a traditional turbine blade. FIG. 7B is a stress diagram of one of attachment grooves AG of rotor disk 80 showing stress concentrations in rotor disk 80 caused by root section 82 of turbine blade 78 of FIGS. 4-6. Both FIGS. 7A and 7B show a side profile of one side of attachment groove AG. As shown in FIGS. 7A and 7B, each side of attachment groove AG of rotor 80 includes first lobe 120A, second lobe 120B, and third love 120C. Attachment groove AG also includes first fillet 121A, second fillet 121B, and third fillet 121C. Lobes 120A-120C alternate with fillets 121A-121C to form a fir-tree profile that can mate with attachment body 106 of root section 82 of turbine blade 78. No turbine blades are shown in FIGS. 7A and 7B to allow a clear view of attachment groove AG.

When a turbine blade without first scarf cut 116 and without second scarf cut 118 is installed in attachment groove AG of rotor disk 80 and rotated by gas flow, centrifugal loads between the turbine blade and rotor disk 80 can cause stress concentration SC1 to develop in rotor disk 80 at forward side 83 in second fillet 121B between second lobe 120B and third lobe 120C. Stress concentration SC1 shown in FIG. 7A is high enough to reduce the operational life of rotor disk 80.

Including first scarf cut 116 and second scarf cut 118 onto attachment body 106 of root section 82 helps reduce stress concentrations in rotor disk 80, as shown in FIG. 7B. When attachment body 106 is installed in attachment groove AG of rotor disk 80 and when turbine blade 78 and rotor disk 80 are both rotated by the gas flow passing through high-pressure turbine section 54 (shown in FIG. 1), centrifugal loads between turbine blade 78 and rotor disk 80 can cause stress concentration SC2 to develop in rotor disk 80. The contact between rotor disk 80 and attachment body 106 of turbine blade 78 is completely removed by the first scarf cut 116 and second scarf cut 118 at the forward end of attachment body 106. The lack of contact due to the scarf cuts helps to redistribute load in attachment groove AG aftward, which helps flatten and decrease stress concentration SC2 in comparison to stress concentration SC1 shown in FIG. 7A. Stress concentration SC2 is sufficiently flattened and distributed in comparison to stress concentration SC1 of FIG. 7 that the material and geometry of rotor disk 80 can handle stress concentration SC2 without cracking or wearing prematurely.

DISCUSSION OF POSSIBLE EMBODIMENTS

The following are non-exclusive descriptions of possible embodiments of the present invention.

A turbine blade includes a platform with a top side and a bottom side opposite the top side. An airfoil section extends from the top side of the platform to a tip of the turbine blade. A root section is connected to a bottom side of the platform and includes an attachment body extending from a forward end to an aft end. A first plurality of serrations is formed on a pressure side of the attachment body. Each serration of the first plurality of serrations extends straight on the pressure side of the attachment body from the aft end toward the forward end of the attachment body. A second plurality of serrations is formed on a suction side of the attachment body. Each serration of the second plurality of serrations extends straight in a first direction on the suction side from the aft end toward the forward end of the attachment body. The first plurality of serrations and the second plurality of serrations form a fir-tree shaped profile of the attachment body. An angled surface is formed on the suction side of the attachment body adjacent to the forward end. The angled surface extends along each serration of the second plurality of serrations and is angled toward the pressure side relative to the first direction as the angled surface extends toward the forward end.

The turbine blade of the preceding paragraph can optionally include, additionally and/or alternatively, any one or more of the following features, configurations and/or additional components in the paragraphs below.

In an embodiment of the foregoing turbine blade, the angled surface formed on the suction side of the attachment body is angled toward the pressure side at an angle of at least 6 degrees and no greater than 10 degrees relative to the first direction.

In an embodiment of the foregoing turbine blade, the angled surface formed on the suction side of the attachment body is angled toward the pressure side at an angle of 8 degrees relative to the first direction.

In an embodiment of the foregoing turbine blade, the suction side comprises a first length in the first direction and the angled surface comprises a second length in the first direction, wherein a ratio of the second length to the first length is at least 0.05 and no greater than 0.08.

In an embodiment of the foregoing turbine blade, the ratio of the second length to the first length is 0.065.

In an embodiment of the foregoing turbine blade, the root section further comprises a second angled surface formed on the pressure side of the attachment body adjacent to the forward end, wherein the second angled surface extends along each serration of the first plurality of serrations, and wherein the second angled surface is angled toward the suction side relative to the first direction as the second angled surface extends toward the forward end.

In an embodiment of the foregoing turbine blade, the second angled surface formed on the pressure side of the attachment body is angled toward the suction side at an angle of at least 8 degrees and no greater than 10 degrees relative to the first direction.

In an embodiment of the foregoing turbine blade, the second angled surface formed on the pressure side of the attachment body is angled toward the suction side at an angle of 10 degrees relative to the first direction.

In an embodiment of the foregoing turbine blade, the pressure side comprises a third length in the first direction and the second angled surface comprises a fourth length in the first direction, wherein a ratio of the fourth length to the third length is at least 0.05 and no greater than 0.08.

In an embodiment of the foregoing turbine blade, the ratio of the fourth length to the third length is 0.065.

A turbine blade includes a platform with a top side and a bottom side opposite the top side. An airfoil section extends from the top side of the platform to a tip of the turbine blade. A root section extends from the bottom side of the platform. The root section includes a first end and a second end aft of the first end relative to a flow direction of the turbine blade. A first plurality of serrations is formed on a pressure side of the root section. Each serration of the first plurality of serrations extends on the pressure side of the root section from the first end to the second end of the root section. A second plurality of serrations is formed on a suction side of the root section. Each serration of the second plurality of serrations extends on the suction side from the first end to the second end of the root section. The first plurality of serrations and the second plurality of serrations form a fir-tree shaped profile of the root section. A first scarf cut is formed on the suction side of the root section and extends aft from the first end toward the second end of the root section. The first scarf cut is formed on each serration of the second plurality of serrations such that each serration of the second plurality of serrations is tapered at the first end of the root section.

The turbine blade of the preceding paragraph can optionally include, additionally and/or alternatively, any one or more of the following features, configurations and/or additional components in the paragraphs below.

In an embodiment of the foregoing turbine blade, each serration of the second plurality of serrations extends straight in a first direction from the second end to the first scarf cut.

In an embodiment of the foregoing turbine blade, the first scarf cut is angled toward the pressure side at an angle of at least 6 degrees and no greater than 10 degrees relative to the first direction.

In an embodiment of the foregoing turbine blade, the first scarf cut is angled toward the pressure side at an angle of 8 degrees relative to the first direction.

In an embodiment of the foregoing turbine blade, the suction side comprises a first length in the first direction and the first scarf cut comprises a second length in the first direction, wherein a ratio of the second length to the first length is at least 0.05 and no greater than 0.08.

In an embodiment of the foregoing turbine blade, the ratio of the second length to the first length is 0.065.

In an embodiment of the foregoing turbine blade, the root section further comprises a second scarf cut formed on the pressure side of the root section and extending aft from the first end toward the second end of the root section, wherein the second scarf cut is formed on each serration of the first plurality of serrations such that each serration of the first plurality of serrations is tapered at the first end of the root section.

In an embodiment of the foregoing turbine blade, each serration of the first plurality of serrations extends straight on the pressure side from the second end to the second scarf cut, and wherein the second scarf cut is angled toward the suction side at an angle of 10 degrees relative to the first direction.

In an embodiment of the foregoing turbine blade, the pressure side comprises a third length in the first direction and the second angled surface comprises a fourth length in the first direction, wherein a ratio of the fourth length to the third length is 0.065.

A turbine blade includes a platform comprising a top side and a bottom side opposite the top side. An airfoil section extends from the top side of the platform to a tip of the turbine blade. A root section is connected to a bottom side of the platform. The root section includes an attachment body extending from a forward end to an aft end. A first plurality of serrations is formed on a pressure side of the attachment body. Each serration of the first plurality of serrations extends on the pressure side of the attachment body from the forward end to the aft end of the attachment body. A second plurality of serrations is formed on a suction side of the attachment body. Each serration of the second plurality of serrations extends on the suction side from the forward end to the aft end of the attachment body. The first plurality of serrations and the second plurality of serrations form a fir-tree shaped profile of the attachment body. Each serration of the second plurality of serrations is tapered at the forward end.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine blade comprising:
   a platform comprising a top side and a bottom side opposite the top side;
   an airfoil section extending from the top side of the platform to a tip of the turbine blade; and
   a root section connected to a bottom side of the platform, wherein the root section comprises:
      an attachment body extending from a forward end to an aft end;
      a first plurality of serrations formed on a pressure side of the attachment body, wherein each serration of the first plurality of serrations extends straight in a first direction on the pressure side of the attachment body from the aft end toward the forward end of the attachment body;
      a second plurality of serrations formed on a suction side of the attachment body, wherein each serration of the second plurality of serrations extends straight in the first direction on the suction side from the aft end toward the forward end of the attachment body, wherein the first plurality of serrations and the second plurality of serrations form a fir-tree shaped profile of the attachment body; and
      an angled surface formed on the suction side of the attachment body adjacent to the forward end, wherein the angled surface extends along each serration of the second plurality of serrations, and wherein the angled surface is angled toward the pressure side relative to the first direction as the angled surface extends toward the forward end.

2. The turbine blade of claim 1, wherein the angled surface formed on the suction side of the attachment body is angled toward the pressure side at an angle of at least 6 degrees and no greater than 10 degrees relative to the first direction.

3. The turbine blade of claim 2, wherein the angled surface formed on the suction side of the attachment body is angled toward the pressure side at an angle of 8 degrees relative to the first direction.

4. The turbine blade of claim 3, wherein the suction side comprises a first length in the first direction and the angled surface comprises a second length in the first direction, wherein a ratio of the second length to the first length is at least 0.05 and no greater than 0.08.

5. The turbine blade of claim 4, wherein the ratio of the second length to the first length is 0.065.

6. The turbine blade of claim 5, wherein the root section further comprises:
   a second angled surface formed on the pressure side of the attachment body adjacent to the forward end, wherein the second angled surface extends along each serration of the first plurality of serrations, and wherein the second angled surface is angled toward the suction side relative to the first direction as the second angled surface extends toward the forward end.

7. The turbine blade of claim 6, wherein the second angled surface formed on the pressure side of the attachment body is angled toward the suction side at an angle of at least 8 degrees and no greater than 10 degrees relative to the first direction.

8. The turbine blade of claim 7, wherein the second angled surface formed on the pressure side of the attachment body is angled toward the suction side at an angle of 10 degrees relative to the first direction.

9. The turbine blade of claim 8, wherein the pressure side comprises a third length in the first direction and the second angled surface comprises a fourth length in the first direction, wherein a ratio of the fourth length to the third length is at least 0.05 and no greater than 0.08.

10. The turbine blade of claim 9, wherein the ratio of the fourth length to the third length is 0.065.

11. A turbine section comprising:
    a rotor disk comprising a plurality of attachment grooves formed in the rotor disk and circumferentially spaced around the rotor disk; and
    a turbine blade comprising:
       a platform comprising a top side and a bottom side opposite the top side;
       an airfoil section extending from the top side of the platform to a tip of the turbine blade; and
       a root section extending from the bottom side of the platform and configured to mate with an attachment groove of the plurality of attachment grooves, wherein the root section comprises:
          a first end;
          a second end aft of the first end relative to a flow direction of the turbine blade;
          a suction side of the root section extending from the first end to the second end;
          a pressure side of the root section extending from the first end to the second end of the root section;
          a first scarf cut formed on the suction side and extending aft from the first end toward the second end of the root section, wherein the first scarf cut is angled toward the pressure side as the first scarf cut extends toward the first end;
          a second scarf cut formed on the pressure side and extending aft from the first end toward the second end of the root section, wherein the second scarf cut is angled toward the suction side as the second scarf cut extends toward the first end;
          a first plurality of serrations formed on the pressure side of the root section, wherein each serration of the first plurality of serrations extends on the pressure side of the root section from the first end to the second end of the root section, and wherein each serration of the first plurality of serrations is tapered at the forward end toward a suction side; and
          a second plurality of serrations formed on the suction side of the root section, wherein each serration of the second plurality of serrations extends on the suction side from the first end to the second end of the root section, and wherein the first plurality of serrations and the second plurality of serrations form a fir-tree shaped profile of the root section that is fully housed within the attachment groove.

12. The turbine section of claim 11, wherein the suction side extends straight in a first direction from the second end to the first scarf cut.

13. The turbine section of claim 12, wherein the first scarf cut is angled toward the pressure side at an angle of at least 6 degrees and no greater than 10 degrees relative to the first direction.

14. The turbine section of claim 13, wherein the first scarf cut is angled toward the pressure side at an angle of 8 degrees relative to the first direction.

15. The turbine section of claim 14, wherein the suction side comprises a first length in the first direction and the first scarf cut comprises a second length in the first direction, wherein a ratio of the second length to the first length is at least 0.05 and no greater than 0.08.

16. The turbine section of claim 15, wherein the pressure side extends straight from the second end to the second scarf cut, and wherein the second scarf cut is angled toward the suction side at an angle of 10 degrees relative to the first direction.

17. The turbine section of claim 16, wherein the pressure side comprises a third length in the first direction and the second scarf cut comprises a fourth length in the first direction, wherein a ratio of the fourth length to the third length is 0.065.

18. A turbine section comprising:
- a rotor disk comprising a plurality of attachment grooves formed in the rotor disk and circumferentially spaced around the rotor disk; and
- a turbine blade comprising:
  - a platform comprising a top side and a bottom side opposite the top side;
  - an airfoil section extending from the top side of the platform to a tip of the turbine blade; and
  - a root section connected to a bottom side of the platform and configured to mate with an attachment groove of the plurality of attachment grooves, wherein the root section comprises:
    - an attachment body extending from a forward end to an aft end;
    - a first plurality of serrations formed on a pressure side of the attachment body, wherein each serration of the first plurality of serrations extends on the pressure side of the attachment body from the forward end to the aft end of the attachment body, and wherein each serration of the first plurality of serrations is tapered at the forward end toward a suction side; and
    - a second plurality of serrations formed on the suction side of the attachment body, wherein each serration of the second plurality of serrations extends on the suction side from the forward end to the aft end of the attachment body, and wherein each serration of the second plurality of serrations is tapered at the forward end toward the pressure side;
  - wherein the forward end and the aft end of the attachment body are within the attachment groove.

* * * * *